US012627220B2

(12) United States Patent
Bohlländer

(10) Patent No.: US 12,627,220 B2
(45) Date of Patent: May 12, 2026

(54) POWER CONVERTER AND METHOD FOR OPERATING A POWER CONVERTER

(71) Applicant: Rolls-Royce Deutschland Ltd & Co KG, Blankenfelde-Mahlow (DE)

(72) Inventor: Marco Bohlländer, Hirschaid (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 336 days.

(21) Appl. No.: 18/037,563

(22) PCT Filed: Nov. 1, 2021

(86) PCT No.: PCT/EP2021/080262

§ 371 (c)(1),
(2) Date: Nov. 27, 2023

(87) PCT Pub. No.: WO2022/106183

PCT Pub. Date: May 27, 2022

(65) Prior Publication Data

US 2024/0258910 A1 Aug. 1, 2024

(30) Foreign Application Priority Data

Nov. 20, 2020 (DE) ...................... 10 2020 214 652.7

(51) Int. Cl.

| | |
|---|---|
| *H02M 1/44* | (2007.01) |
| *H02M 1/00* | (2007.01) |
| *H02M 7/00* | (2006.01) |
| *H02P 27/00* | (2006.01) |

(52) U.S. Cl.
CPC ........... *H02M 1/44* (2013.01); *H02M 1/0022* (2021.05); *H02M 7/003* (2013.01); *H02P 27/00* (2013.01)

(58) Field of Classification Search
CPC ...... H02M 1/44; H02M 1/0022; H02M 7/003; H02P 27/00
See application file for complete search history.

(56) References Cited

U.S. PATENT DOCUMENTS

| | | | | |
|---|---|---|---|---|
| 9,231,482 | B2 * | 1/2016 | Trunk | H02M 3/33507 |
| 2006/0192522 | A1 * | 8/2006 | Kerkman | H02M 7/48 |
| | | | | 318/812 |
| 2019/0149076 | A1 * | 5/2019 | Sumasu | H02P 6/08 |
| | | | | 318/400.13 |

FOREIGN PATENT DOCUMENTS

| | | |
|---|---|---|
| DE | 102010030079 A1 | 12/2011 |
| DE | 102016211387 A1 | 12/2017 |

* cited by examiner

*Primary Examiner* — Zoheb S Imtiaz
(74) *Attorney, Agent, or Firm* — Lempia Summerfield Katz LLC

(57) ABSTRACT

The present invention relates to a power converter and to a method for operating same, wherein the power converter is designed to receive two input potentials DC+ and DC−, the power converter comprising a first anti-interference capacitor in order to connect the input potential DC+ capacitively to earth, a second anti-interference capacitor in order to connect the input potential DC− capacitively to earth, a first voltmeter for measuring a first voltage drop Uyp across the first anti-interference capacitor, a second voltmeter for measuring a second voltage drop Uyn across the second anti-interference capacitor, and a calculation unit which is designed to determine a DC link voltage Uzk dropping between the input potential DC+ and the input potential DC− using the first voltage drop Uyp and the second voltage drop Uyn.

16 Claims, 2 Drawing Sheets

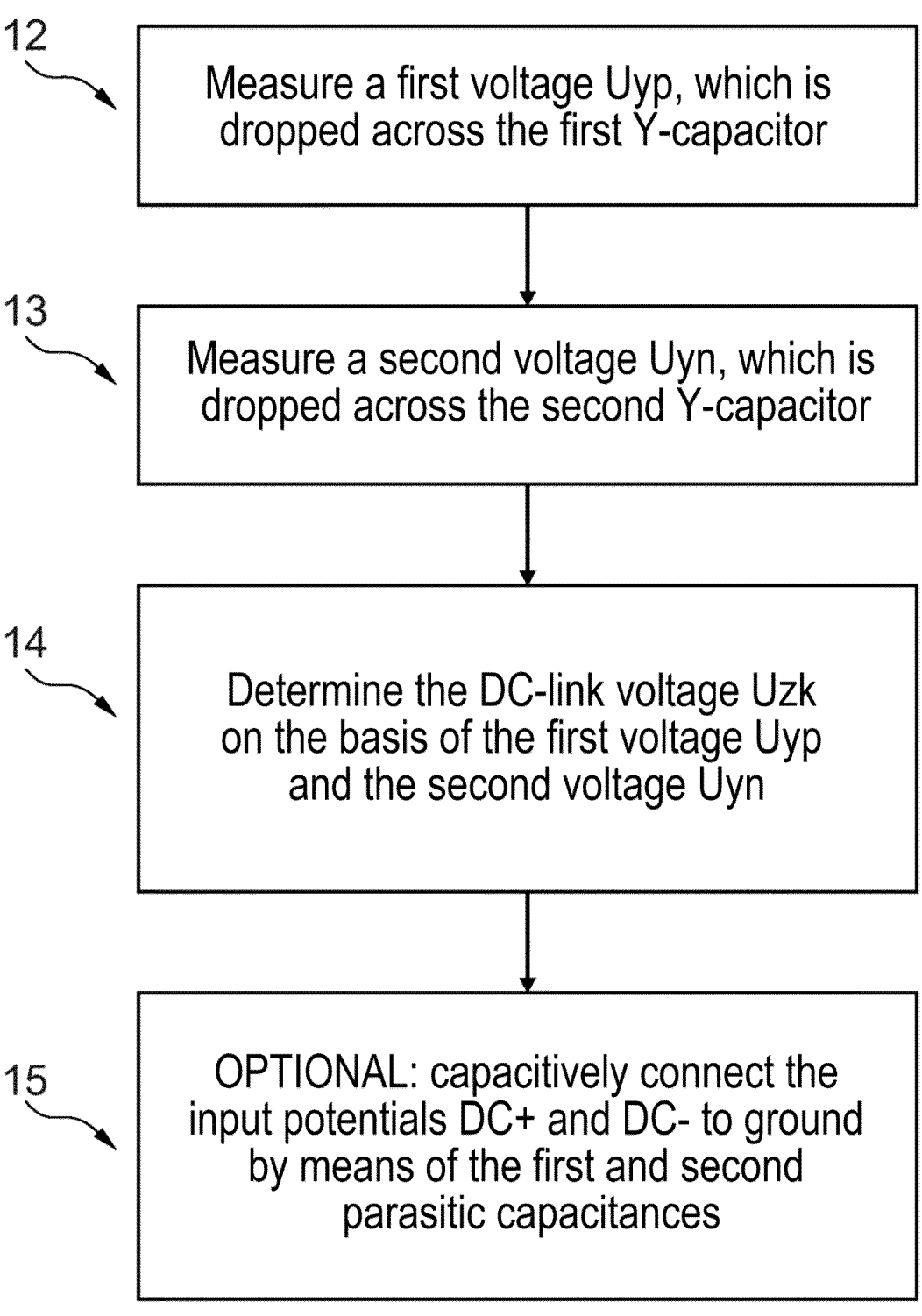

12

Measure a first voltage Uyp, which is dropped across the first Y-capacitor

13

Measure a second voltage Uyn, which is dropped across the second Y-capacitor

14

Determine the DC-link voltage Uzk on the basis of the first voltage Uyp and the second voltage Uyn

15

OPTIONAL: capacitively connect the input potentials DC+ and DC- to ground by means of the first and second parasitic capacitances

Fig. 3

POWER CONVERTER AND METHOD FOR OPERATING A POWER CONVERTER

This application is the National Stage of International Application No. PCT/EP2021/080262, filed Nov. 1, 2021, which claims the benefit of German Patent Application No. DE 10 2020 214 652.7, filed Nov. 20, 2020. The entire contents of these documents are hereby incorporated herein by reference.

FIELD

The present embodiments relate to a power converter configured to receive two input potentials, and to a method for operating such a power converter.

BACKGROUND

Power converters (e.g., inverters) in electrical drives with electric motor are commonly used in low-voltage DC networks (e.g., in IT networks). So that the power converter may drive the motor correctly, various sensors are required in order to determine an electrical actual state (e.g., to calculate and implement on the basis thereof correct switching of the power semiconductors installed in the power converter). A quantity that represents the electrical actual state is the DC-link voltage Uzk. Therefore, power converters usually have a sensor system for ascertaining the DC-link voltage Uzk. Further, inverters in the IT network are connected capacitively by interference suppression capacitors from DC+ and DC− respectively to ground for the purpose of voltage balancing. These capacitors are configured to balance the input potentials DC+ and DC− with respect to ground, and are mostly selected from the class of Y-capacitors. The interference suppression capacitors are configured for the normal situation (e.g., for the situation in which there is no short to ground in the IT network). In a fault situation in which there is a short to ground, these capacitors are placed under an increased load. It is therefore advantageous to be able to identify this fault situation.

For the purpose of ascertaining the DC-link voltage Uzk, it has already been proposed to ascertain this voltage via a direct sensor system. This sensor system is configured to pick up at suitable terminals carrying the DC+/− potential the voltage to be measured, to step-down passively the voltage, and then to transfer the value as a raw actual value to a controller in a galvanically isolated manner.

This has the disadvantage, however, that fault situations (e.g., shorts to ground) cannot be detected.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a power converter and a method for operating a power converter that at least mitigates the above disadvantage are provided.

According to a first aspect of the present embodiments, a power converter includes a first voltmeter for measuring a first voltage drop Uyp across a first interference suppression capacitor, a second voltmeter for measuring a second voltage drop Uyn across a second interference suppression capacitor, and a calculation unit. The calculation unit is configured to determine, using the first voltage drop Uyp and the second voltage drop Uyn, a DC-link voltage Uzk dropped between an input potential DC+ and an input potential DC−.

The power converter may be fed from a high-voltage network (e.g., a balanced DC network) or an energy source (e.g., a battery) and may be configured to produce a DC voltage in a low-voltage network (e.g., in an IT network). Unlike conventional power converters, a direct measurement of the DC-link voltage Uzk between the input potentials DC+ and DC− is replaced by a measurement of the voltage Uyp between the ground potential and the input potential DC+, and of the voltage Uyn between the input potential DC− and the ground potential. Using the measured voltages Uyp and Uyn, the DC-link voltage Uzk may be ascertained using Kirchhoff's loop rule equation $0=Uyp+Uzk+Uyn$. Solving for the wanted DC-link voltage Uzk yields Uzk (using the passive sign convention) as $Uzk=-(Uyp+Uyn)$.

The measurement arrangement according to the present embodiments allows the input potentials with respect to ground to be assessed during operation of the inverter while at the same time replacing the DC-link voltage measurement, thereby keeping the number of sensors (e.g., voltmeters) as small as possible. Further, the DC-link voltage Uzk may be calculated using simple addition of two measured values Uyp and Uyn.

The voltages Uyp and Uyn determined by the voltmeters may be used, in addition to calculating the DC-link voltage Uzk, for extended diagnostic purposes (e.g., for identifying a short circuit). For example, slightly or severely increased ripple voltages may be identified, indicating a phase-to-ground short circuit. Whether increased ripple voltages exist may be ascertained by a fast Fourier transform (FFT) or more simply by a min-max value determination. When ascertaining using the FFT, increased ripple voltages may be identified by an increase in the amplitudes of the harmonics. If the min-max value determination is used, simply the height of a ripple is determined.

A further advantage of the present embodiments is that the present embodiments make it possible to identify a voltage imbalance from DC+/− to ground. In the event of a short circuit from DC+ or DC− to ground, the short-circuited potential "latches" hard to ground (so either Uyp or Uyn). A waveform of the ripple voltage then shows an additional ripple. After the "latching," the short-circuited potential remains permanently at a voltage=0. The other potential retains the full ripple and "latches" to Uzk.

In addition, the present embodiments create further diagnostic opportunities. The measured voltages Uyp and Uyn may be provided, for example, to an insulation monitor external to the inverter, and the measurement results from the insulation monitor may be checked for plausibility using the voltages Uyp/Uyn. In addition, temperatures of the interference suppression capacitors, which are not configured for the short-circuit situation, may be monitored. The internal temperature of the interference suppression capacitors, which is a function of their ohmic resistance prevailing in the short-circuit situation, may be inferred via a voltage-ripple load. It is thereby possible to identify and avoid an overload of the interference suppression capacitors.

In a design embodiment, the power converter includes a voltage input that is configured to receive the input potentials DC+ and DC−. The first interference suppression capacitor and the second interference suppression capacitor are arranged in the voltage input and are configured to balance the input potentials DC+ and DC−. The voltage input may be configured to receive and provide to the inverter an input voltage from an HV network (e.g., from a battery). The voltage input may also be configured to galvanically isolate the HV network from ground. The voltage input may also be a separate module in which the determining of the voltages Uyp and Uyn may be performed. The balancing of the input potentials DC+ and DC− by the interference suppression capacitors may likewise take place in the voltage input. When an electric motor is in generator mode, the voltage input may also be used for outputting output potentials DC+ and DC−.

In a design embodiment, the power converter includes a DC-link capacitor that is connected in the voltage input between the input potential DC+ and the input potential DC−. The DC-link voltage Uzk is dropped across the DC-link capacitor. The DC-link capacitor may also be a separate module consisting of a plurality of capacitors. The effective circuit symbol may be a DC-link capacitor.

In a design embodiment, the power converter has a grounded housing, and a potential-ground pick-up for the first voltmeter and the second voltmeter is made at a same geometric point on the housing. In an IT network, the housing is typically grounded. Combining the two potential-ground pick-ups for the first voltmeter Uyp and the second voltmeter Uyn at one geometric point results in a loop without parasitic potential offsets, which would arise given different housing pick-up points and would bring an additional, dynamic component into the loop equation. Parasitic potential offsets are neutralized if the potentials DC+ and DC− are determined with respect to the same geometric point on the housing. This increases the measurement accuracy.

In a design embodiment, the first voltmeter and the second voltmeter each have parasitic capacitances and are configured to connect the power converter capacitively from the input potentials DC+ and DC− to ground (e.g., where the first interference suppression capacitor is formed by the parasitic capacitance of the first voltmeter, and where the second interference suppression capacitor is formed by the parasitic capacitance of the second voltmeter). The voltmeters with their parasitic capacitances may themselves be used as interference suppression capacitors. For example, the interference suppression capacitors may also be replaced by a series of high-value resistors that form a voltage divider for the voltmeters according to the present embodiments. Again, these high-value resistors have parasitic capacitances. The high-value resistors thereby act both as a voltage divider for the voltmeters for measuring the voltages Uyp and Uyn, and as interference suppression capacitors. This may avoid duplicated components.

In a design embodiment, the power converter includes a controller and an output stage for supplying voltage to an electric motor.

In a design embodiment, the calculation unit is configured to calculate and provide to the controller the DC-link voltage Uzk. For example, the controller is configured to calculate, based on the DC-link voltage Uzk received from the calculation unit, switching of power semiconductors for driving the electric motor via the output stage. The calculation unit may be a separate unit for measured-value conditioning, which is connected in front of the controller. Alternatively, the calculation unit may be integrated in the controller. The controller ascertains, inter alia, based on the value of the DC-link voltage, switching of the power semiconductors (e.g., a pulse width modulation (PWM) signal) that the controller outputs to the output stage.

According to a second aspect of the present embodiments, a method is created for determining a DC-link voltage Uzk in a power converter that is configured to receive input potentials DC+ and DC−. The power converter includes a first interference suppression capacitor for connecting the input potential DC+ capacitively to ground, and a second interference suppression capacitor for connecting the input potential DC− capacitively to ground. The method includes measuring a first voltage Uyp that is dropped across the first interference suppression capacitor, measuring a second voltage Uyn that is dropped across the second interference suppression capacitor, and determining the DC-link voltage Uzk based on the first voltage Uyp and the second voltage Uyn.

All the advantages and embodiment forms of the first aspect of the present embodiments may be applied analogously also to the second aspect of the present embodiments.

In a design embodiment of the method, the DC-link voltage Uzk is dropped across a DC-link capacitor that is connected in a voltage input of the power converter between the input potential DC+ and the input potential DC−.

For example, the DC-link voltage Uzk may be determined according to the Kirchhoff rule, where: Uzk=−(Uyp+Uyn).

In a design embodiment of the method, the measurement of the first voltage Uyp and of the second voltage Uyn is made on a grounded housing of the power converter, and the first voltage Uyp and the second voltage Uyn are picked up at the same geometric location on the housing.

In a design embodiment of the method, the measurement of the first voltage Uyp and of the second voltage Uyn is made by a first voltmeter and a second voltmeter, where the first voltmeter has a first parasitic capacitance and the second voltmeter has a second parasitic capacitance. In addition, the method may include capacitively connecting the input potentials DC+ and DC− to ground by the first parasitic capacitance and the second parasitic capacitance. This economizes on components.

In a design embodiment of the second aspect of the present embodiments, the method includes outputting the DC-link voltage Uzk to a controller of the power converter for driving an electric motor, and determining, by the controller, based on the DC-link voltage Uzk, switching of power semiconductors for driving the electric motor.

BRIEF DESCRIPTION OF THE DRAWINGS

FIG. 3 shows a flow diagram to illustrate an example method.

DETAILED DESCRIPTION

Figure 1:
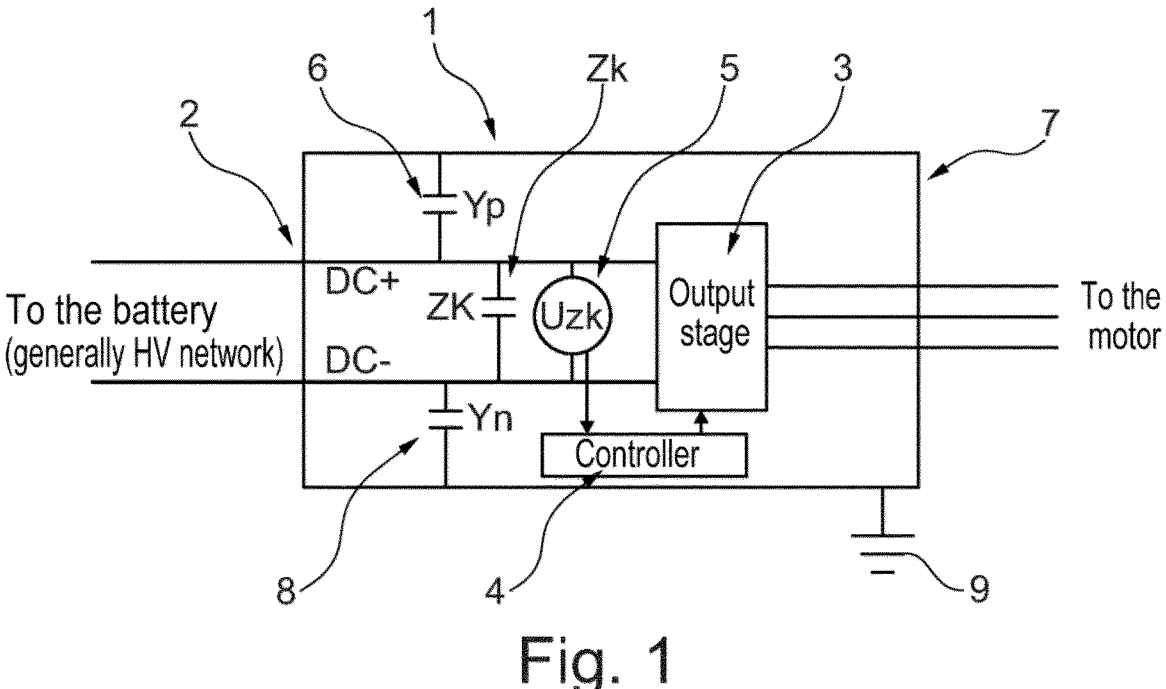
FIG. 1 shows a power converter from the prior art.

FIG. 1 shows a power converter 1 from the prior art. The power converter 1 includes a voltage input 2 for connection of an external voltage supply (not shown). The voltage input 2 receives two potentials DC+ and DC−. The potentials DC+ and DC− are balanced with respect to each other (e.g., the potentials DC+ and DC− have a same magnitude but differ in polarity). The power converter 1 includes an output stage 3 for outputting a control voltage to an electric motor (not shown). In addition, the power converter 1 includes a controller 4 for calculating a characteristic value for determining a control voltage (e.g., a PWM signal) that is provided to the output stage 3 for transfer to the electric motor. The power converter 1 further includes a measuring apparatus 5 for measuring a DC-link voltage Uzk. The DC-link voltage Uzk is dropped across a DC-link capacitor ZK and is measured by the measuring apparatus 5, which is connected in parallel. The DC-link voltage Uzk is provided to the controller 4. The controller 4 calculates therefrom switching of power semiconductors (not shown), and provides this to the output stage 3. The potential DC+ in the voltage input 2 is capacitively coupled via a first interference suppression capacitor 6 Yp to a housing 7 of the power converter 1. The potential DC– in the voltage input 2 is capacitively coupled via a second interference suppression capacitor 8 Yn to the housing 7 of the power converter 1. The first interference suppression capacitor 6 and the second interference suppression capacitor 8 balance the input voltages DC+ and DC–. The housing 7 is connected to ground 9.

The external voltage supply provides the power converter 1 via the voltage input 2 with a voltage of magnitude equal to the DC-link voltage Uzk=U(DC+–DC–). The DC-link voltage equals in stationary form the voltage dropped across the DC-link capacitor ZK, and is to be determined in order that the controller 4 may produce suitable switching pulses for driving the output stage 3, and for protective purposes. In this case, the measuring apparatus 5 measures the potential difference directly [DC+ minus DC–]. Depending on the application, this voltage may also be measured in duplicate by mutually independent sensors in order to be able to check the reliability of the sensor signal. In an IT network, the HV network, which is galvanically isolated from ground 9, is capacitively coupled and balanced via the interference suppression capacitors 6,8, with the result that Uyp is of equal, or approximately equal, magnitude to Uyn. The voltages Uyp and Uyn themselves are not measured, however. No sensors are provided for this.

Figure 2:
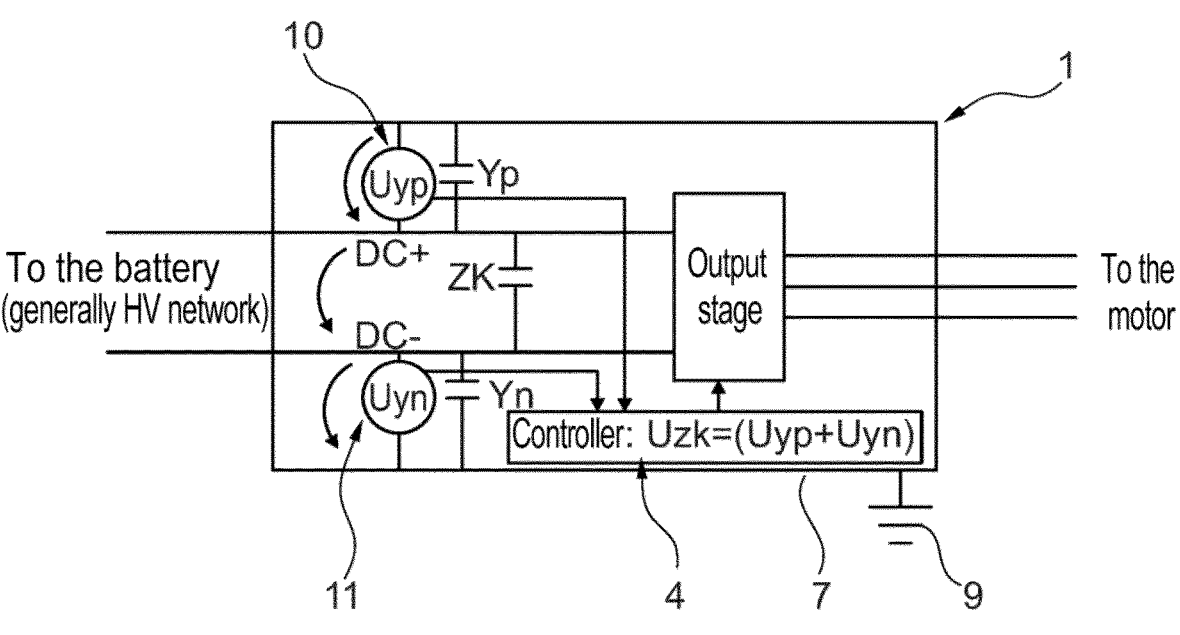
FIG. 2 shows an example power converter.

FIG. 2 shows an example power converter 1 according to the present embodiments. The power converter 1 includes a first voltmeter 10 for measuring the voltage Uyp, and a second voltmeter 11 for measuring the voltage Uyn. The first voltmeter 10 and the second voltmeter are connected in parallel with the first interference suppression capacitor 6 and the second interference suppression capacitor 8, and measure the voltages Uyp and Uyn dropped across the first interference suppression capacitor 6 and the second suppression capacitor 8. The power converter 1 likewise includes the DC-link capacitor ZK, but not a measuring apparatus 5 for measuring the DC-link voltage Uzk. The controller 4 is configured to receive the values of the voltages Uyp and Uyn dropped across the first interference suppression capacitor 6 and the second interference suppression capacitor 8 and measured by the first voltmeter 10 and the second voltmeter 11. The controller 4 includes a calculation unit. The calculation unit calculates, using Kirchhoff's loop equation, the DC-link voltage Uzk, which gives Uzk=–(Uyp+Uyn). The loop is formed by the sum of the voltage drops across the first interference suppression capacitor 6, the DC-link capacitor ZK, and the second interference suppression capacitor 8 with respect to the housing 7, which is connected to ground 6. Neglecting parasitic capacitances, the following holds: 0=Uzk+Uyp+Uyn. The value of the DC-link voltage Uzk calculated by the calculation unit using Kirchhoff's loop equation and solved for Uzk, Uzk=–(Uyp+Uyn) is provided to the controller, which calculates therefrom the switching of the power semiconductors, and provides this to the output stage 3.

FIG. 3 is a flow diagram for illustrating an example method according to the second aspect of the present embodiments. In the first act 12, the first voltmeter 10 measures the voltage Uyp that is dropped across the first interference suppression capacitor 6. In the second act 13, the second voltmeter 11 measures the voltage Uyn that is dropped across the second interference suppression capacitor 8. In the third act 14, the controller 4 determines, using the solved Kirchhoff's loop equation Uzk=–(Uyp+Uyn), the value of the DC-link voltage Uzk. In the fourth act 15, a capacitive connection of the input potentials DC+ and DC– to ground may be made even without interference suppression capacitors. Instead of the interference suppression capacitors, parasitic capacitances of the first voltmeter 10 and the second voltmeter 11 are used.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A power converter configured to receive an input potential DC+ and an input potential DC–, the power converter comprising:
   a first interference suppression capacitor configured to connect the input potential DC+ capacitively to ground;
   a second interference suppression capacitor configured to connect the input potential DC– capacitively to ground;
   a first voltmeter for measuring a first voltage drop across the first interference suppression capacitor;
   a second voltmeter for measuring a second voltage drop across the second interference suppression capacitor; and
   a calculation unit configured to determine, using the first voltage drop and the second voltage drop, a DC-link voltage dropped between the input potential DC+ and the input potential DC–.

2. The power converter of claim 1, further comprising a voltage input configured to receive the input potential DC+ and the input potential DC–,
   wherein the first interference suppression capacitor and the second interference suppression capacitor are arranged in the voltage input and are configured to balance the input potential DC+ and the input potential DC–.

3. The power converter of claim 2, further comprising a DC– link capacitor that is connected in the voltage input between the input potential DC+ and the input potential DC–,
   wherein the DC-link voltage is dropped across the DC-link capacitor.

4. The power converter of claim 1, wherein the power converter has a grounded housing, and a potential-ground pick-up for the first voltmeter and the second voltmeter is made at a same geometric point on the grounded housing.

5. The power converter of claim 1, wherein the first voltmeter and the second voltmeter each have parasitic capacitances and are configured to connect the power converter capacitively from the input potential DC+ and the input potential DC– to ground.

6. The power converter of claim 1, further comprising a controller and an output stage for supplying voltage to an electric motor.

7. The power converter of claim 6, wherein the calculation unit is configured to calculate and provide to the controller the DC-link voltage, and wherein the controller is configured to calculate, based on the DC-link voltage, switching of power semiconductors for driving the electric motor.

8. A method for determining a DC-link voltage in a power converter that is configured to receive an input potential DC+ and an input potential DC−, the power converter comprising a first interference suppression capacitor configured to connect the input potential DC+ capacitively to ground, and a second interference suppression capacitor configured to connect the input potential DC− capacitively to ground, the method comprising:

measuring a first voltage that is dropped across the first interference suppression capacitor;

measuring a second voltage that is dropped across the second interference suppression capacitor; and determining the DC-link voltage based on the first voltage and the second voltage.

9. The method of claim 8, wherein the DC-link voltage is dropped across a DC-link capacitor that is connected in a voltage input of the power converter between the input potential DC+ and the input potential DC−.

10. The method of claim 8, wherein the determining of the DC-link voltage is performed according to Kirchhoff's rule, which gives Uzk=−(Uyp+Uyn).

11. The method of claim 8, wherein the measuring of the first voltage and the measuring of the second voltage are made on a grounded housing of the power converter, and wherein the first voltage and the second voltage are picked up at a same geometric location on the housing.

12. The method of claim 8, wherein the measuring of the first voltage and the measuring of the second voltage are made by a first voltmeter and a second voltmeter, wherein the first voltmeter has a first parasitic capacitance, and the second voltmeter has a second parasitic capacitance, and wherein the method further comprises capacitively connecting the input potential DC+ and the input potential DC− to ground by the first parasitic capacitance and the second parasitic capacitance.

13. The method of claim 8, further comprising outputting the DC-link voltage to a controller of the power converter for driving an electric motor; and determining, by the controller, switching of power semiconductors for driving the electric motor based on the DC-link voltage.

14. The power converter of claim 5, wherein the first interference suppression capacitor is formed by the parasitic capacitance of the first voltmeter, and wherein the second interference suppression capacitor is formed by the parasitic capacitance of the second voltmeter.

15. The power converter of claim 7, wherein the driving is performed via the output stage.

16. A power converter configured to receive an input potential DC+ and an input potential DC−, the power converter comprising:

a first interference suppression capacitor configured to connect the input potential DC+ capacitively to ground;

a second interference suppression capacitor configured to connect the input potential DC− capacitively to ground;

a first voltmeter for measuring a first voltage drop across the first interference suppression capacitor;

a second voltmeter for measuring a second voltage drop across the second interference suppression capacitor; and a calculation unit configured to determine, using the first voltage drop and the second voltage drop, a DC-link voltage dropped between the input potential DC+ and the input potential DC−, wherein the first voltmeter and the second voltmeter each have parasitic capacitances and are configured to connect the power converter capacitively from the input potential DC+ and the input potential DC− to ground, wherein the first interference suppression capacitor is formed by the parasitic capacitance of the first voltmeter, and wherein the second interference suppression capacitor is formed by the parasitic capacitance of the second voltmeter.

* * * * *